United States Patent
Hirata

(10) Patent No.: US 8,749,923 B2
(45) Date of Patent: Jun. 10, 2014

(54) SUSPENSION SUBSTRATE, SUSPENSION, SUSPENSION WITH HEAD AND HARD DISK DRIVE

(75) Inventor: Kenro Hirata, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 260 days.

(21) Appl. No.: 12/641,656

(22) Filed: Dec. 18, 2009

(65) Prior Publication Data

US 2010/0157482 A1    Jun. 24, 2010

(30) Foreign Application Priority Data

Dec. 22, 2008  (JP) .................. 2008-325298
Sep. 7, 2009  (JP) .................. 2009-205858

(51) Int. Cl.
    *G11B 5/48*    (2006.01)
(52) U.S. Cl.
    USPC .................. 360/245.8; 360/245.9
(58) Field of Classification Search
    USPC .......................... 360/245.8–245.9
    See application file for complete search history.

(56) References Cited

U.S. PATENT DOCUMENTS

| | | | | |
|---|---|---|---|---|
| 5,862,010 | A * | 1/1999 | Simmons et al. | 360/97.01 |
| 6,861,757 | B2 * | 3/2005 | Shimoto et al. | 257/773 |
| 7,518,830 | B1 | 4/2009 | Panchal et al. | |
| 7,929,252 | B1 * | 4/2011 | Hentges et al. | 360/245.9 |
| 2002/0048944 | A1 * | 4/2002 | Tang et al. | 438/672 |
| 2003/0045024 | A1 * | 3/2003 | Shimoto et al. | 438/106 |
| 2007/0041123 | A1 * | 2/2007 | Swanson et al. | 360/122 |
| 2008/0253028 | A1 * | 10/2008 | Chang et al. | 360/244.3 |
| 2009/0113702 | A1 | 5/2009 | Hogg | |

FOREIGN PATENT DOCUMENTS

JP    11-039628 A    2/1999
JP    2005-011387 A    1/2005

* cited by examiner

*Primary Examiner* — Wayne Young
*Assistant Examiner* — Carlos E Garcia
(74) *Attorney, Agent, or Firm* — Ladas & Parry LLP

(57) ABSTRACT

A main object of the present invention is to provide a suspension substrate which can decrease the whole thickness thereof and limit the generation of warpage. To attain the object, the present invention provides a suspension substrate comprising: an insulation layer, a pair of wirings consisting of an upper wiring formed on one surface of the insulation layer and a lower wiring formed on the other surface of the insulation layer, and a metal substrate formed on the surface of the insulation layer on the lower wiring side.

8 Claims, 8 Drawing Sheets

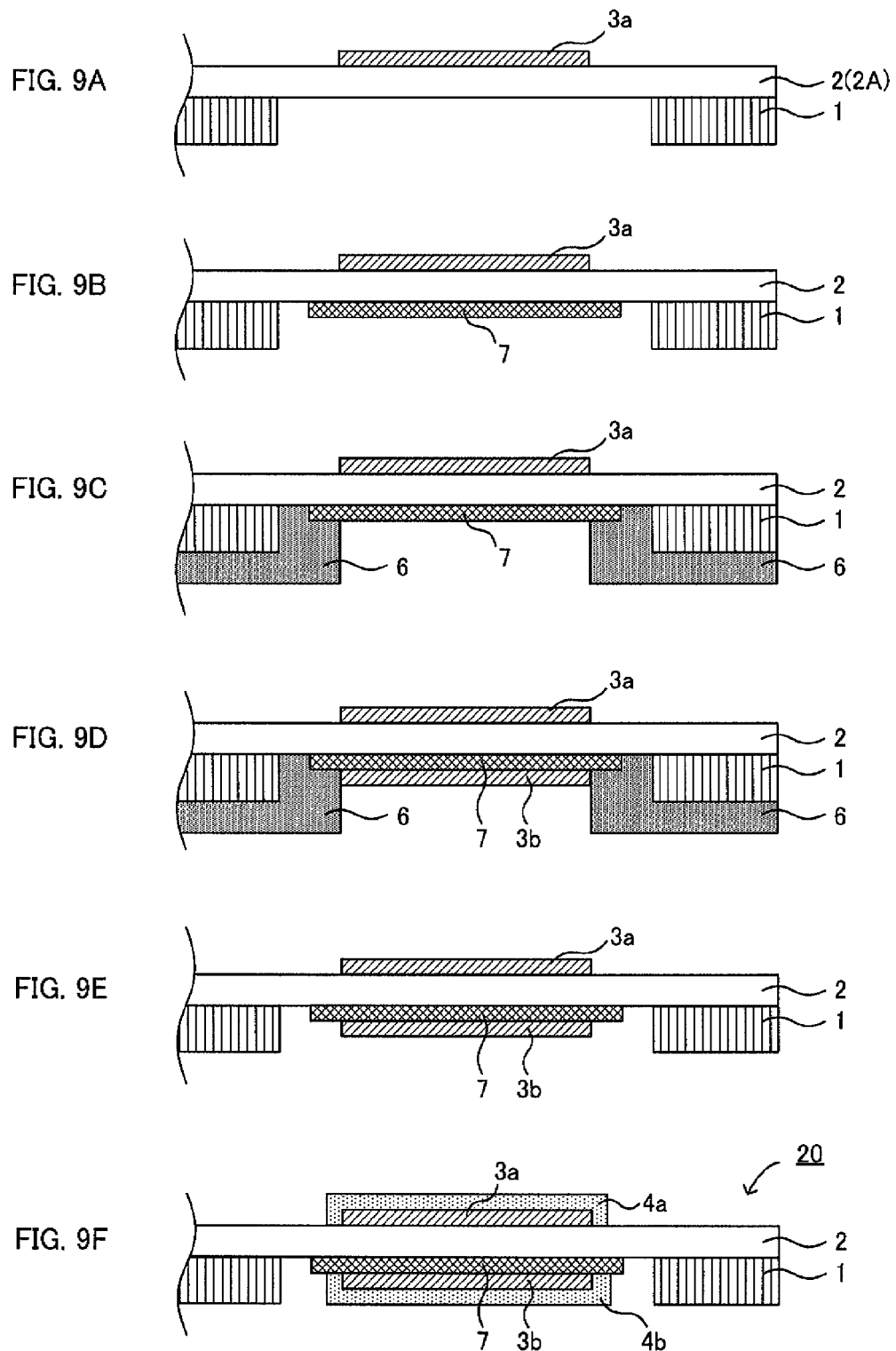

(UNIT OF μm)

(UNIT OF μm)

(UNIT OF μm)

SUSPENSION SUBSTRATE, SUSPENSION, SUSPENSION WITH HEAD AND HARD DISK DRIVE

BACKGROUND OF THE INVENTION

1. Field of the Invention

The present invention relates to a suspension substrate used for a hard disc drive (HDD), and, particularly, to a suspension substrate allowing the whole thickness to be small.

2. Description of the Related Art

A recent distribution of internet and the like have created demands for increases in the amount of information processing and in information processing speed of a personal computer. Along with this trend, it has come to be necessary that hard disc drives (HOD) incorporated into a personal computer be increased in capacity and in rate of information throughput. Then, the part called "magnetic head suspension" which is used in this HOD for supporting the magnetic head is also shifted from a conventional type obtained by connecting signal lines such as gold wires to a wire-integrated type (flexure) called "wireless suspension" which is obtained by forming signal lines such as copper wires directly on a stainless spring. Also, it has come to be necessary to design the suspension substrate as a distributed constant circuit along with increase in rate of information throughput.

The wirings formed on such a suspension substrate are usually formed in pairs on the same surface of the insulation layer as shown in Japanese Patent Application Laid-Open No. 2005-11387. Usually, a read wiring made of a pair of wirings and a write wiring made of a pair of wirings are formed on the same surface of the insulation layer. In such a pair of wirings, electric signals are transmitted by differential transmission, and the differential impedance which is the characteristic impedance of a differential transmission line as the distribution constant circuit exists between the pair of wirings. It is demanded of this differential impedance to be lowered from the viewpoint of impedance matching along with the development of a magnetic head and preamplifier having a lower impedance.

Here, as mentioned above, in the case of a suspension substrate having a pair of wirings on the same surface of the insulation layer, it is necessary to make the wiring have a very large width (for example, hundreds of micrometers) or to make the insulation layer have a lower thickness (for example, 5 μm or less) to reduce the differential impedance. However, the increase in the width of the wiring is undesirable from the viewpoint of density growth and the decrease in the thickness of the insulation layer poses the problem concerning an increase in the occurrence of pinholes.

SUMMARY OF THE INVENTION

Problems to be Solved by the Invention

In the meantime, an attempt has been made to change the arrangement of the aforementioned pair of wirings. Though, currently, a pair of wirings is arranged on the same surface of the insulation layer (plane arrangement) as explained above, there is an attempt to arrange this pair of wirings vertically through an insulating member (lamination arrangement). As shown in FIG. 13, the lamination arrangement is generally an arrangement having one wiring (lower wiring 103a) formed on a first insulation layer 102a (insulation layer formed on a metal substrate 101) and another wiring (upper wiring 103b) formed on the surface of a second insulation layer 102b formed so as to cover the lower wiring 103a. Like FIG. 2, FIG. 13 is a schematic sectional view of a part of the suspension substrate. The pair of wirings disposed in laminated arrangement has such an advantage that it is unnecessary to increase the width of the wirings and to reduce the thickness of the first insulation layer as compared with the conventional plane arrangement.

However, the suspension substrate having a pair of wirings disposed in laminated arrangement has the structural problem that its entire thickness is more increased than that of a suspension substrate provided with a pair of wirings disposed in plane arrangement.

The present invention has been made in view of this situation and it is a main object of the present invention to provide a suspension substrate of which the whole thickness can be reduced.

Means for Solving the Problems

To attain the above object, the present invention provides a suspension substrate comprising: an insulation layer; a pair of wirings consisting of an upper wiring formed on one surface of the insulation layer and a lower wiring formed on the other surface of the insulation layer; and a metal substrate formed on the surface of the insulation layer on the lower wiring side.

According to the present invention, the lower wiring is formed on the surface of the insulation layer on the metal substrate side, and the whole thickness of the suspension substrate can be therefore reduced. Also, because the suspension substrate can be thinned, it can be more decreased in weight at the same time. The reduction in weight enables the following capability of the suspension substrate to the magnetic disk and therefore, a highly reliable HDD can be obtained. Also, because the suspension substrate of the present invention has a structure provided with no second insulation layer 102b shown in FIG. 13, the generation of warpage caused by the shrinkage of the resin can be limited.

In the above invention, the suspension substrate is preferably provided with an adjusting insulation layer, between the above insulation layer and the lower wiring, to adjust the distance between the above upper wiring and the above lower wiring. The installation of the adjusting insulation layer ensures that the capacitive coupling between the wirings can be reduced by adjusting the distance between the upper wiring and the lower wiring. With the reduction in capacitive coupling, the inductance between both wirings can be reduced, thereby making it possible to improve frequency characteristics by adjusting the width between both wirings so as to keep necessary differential impedance.

In the above invention, the total thickness of the above adjusting insulation layer and lower wiring is preferably lower than the thickness of the above metal substrate. If the total thickness of the adjusting insulation layer and lower wiring is larger than the thickness of the metal substrate, there is the possibility of the suspension substrate being thick though the adjusting insulation layer and lower wiring having such a high thickness does not largely contribute to the strength of the substrate.

In the above invention, the suspension substrate is preferably provided with an adjusting insulation layer, between the above insulation layer and the upper wiring, to adjust the distance between the above upper wiring and the above lower wiring. This reason is as follows. The installation of the adjusting insulation layer ensures that the distance between the upper wiring and the lower wiring can be adjusted. This enables a reduction in the coupling capacitance and inductance between both wirings, thereby making it possible to improve frequency characteristics (particularly high-frequency characteristics) by adjusting the width between both wirings.

In the above invention, the above pair of wirings is preferably a differential wiring. This is because a suspension substrate can be obtained which can transmit electric signals by differential transmission and is therefore suitable to an increase in rate of information throughput.

In the above invention, it is preferable that an upper cover layer be formed so as to cover the above upper wiring and that a lower cover layer be formed so as to cover the above lower wiring. This reason is that because a cover layer is formed on each surface of the metal substrate, the generation of warpage can be more suppressed by properly selecting the dimensions (width and thickness) of the upper cover layer and lower cover layer.

According to the present invention, a suspension comprising the aforementioned suspension substrate is provided.

According to the present invention, a more miniaturized suspension can be made by using the aforementioned suspension substrate.

According to the present invention, a suspension with a head comprising the aforementioned suspension and a magnetic head slider mounted on the suspension is provided.

According to the present invention, a more miniaturized suspension with a head can be made by using the aforementioned suspension substrate.

According to the present invention, a hard disc drive comprising the aforementioned suspension with a head is provided.

According to the present invention, a hard disc drive which is more functionalized can be made by using the above suspension with a head.

Effect of the Invention

The present invention produces such an effect that the whole thickness of a suspension substrate having a pair of wirings which is disposed in laminated arrangement can be decreased.

BRIEF DESCRIPTION OF THE DRAWINGS

FIGS. 9A to 9F are a schematic sectional view showing another example of a method of producing a suspension substrate according to the present invention;

DESCRIPTION OF THE PREFERRED EMBODIMENT

A suspension substrate, a suspension, a suspension with a head, and a hard disc drive according to the present invention will be explained in detail.

A. Suspension Substrate

First, a suspension substrate of the present invention will be explained. The suspension substrate of the present invention comprises: an insulation layer; a pair of wirings constituted of an upper wiring formed on one surface of the insulation layer and a lower wiring formed on the other surface of the insulation layer; and a metal substrate formed on the lower wiring side surface of the insulation layer.

Figure 1:
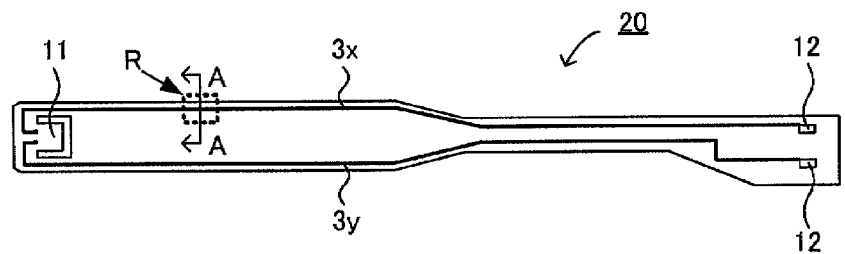
FIG. 1 is a schematic plane view showing an example of a suspension substrate according to the present invention.

Next, the suspension substrate of the present invention will be explained with reference to FIGS. 1 to 3. FIG. 1 is a schematic plan view showing an example of the suspension substrate of the present invention. A suspension substrate 20 shown in FIG. 1 is provided with a gimbal part 11 formed on one end part thereof, a junction substrate connecting part 12 formed on the other end and plural wirings 3 (read wiring 3x and write wiring 3y) connecting the gimbal part 11 with the junction substrate connecting part 12. Although omitted in FIG. 1, plural connecting parts equal in number to the wirings are generally formed in connecting parts (no symbol number attached) of the junction substrate connecting part 12 and gimbal part 11.

Figure 2:
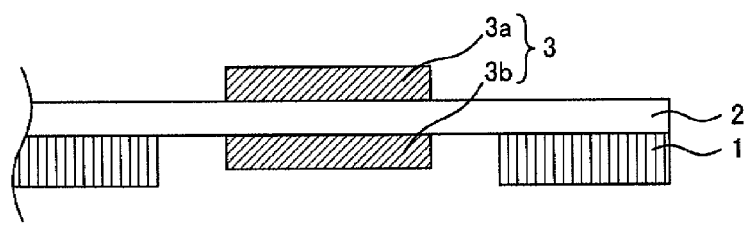
FIG. 2 is a sectional view of the area R along the line A-A of FIG. 1.
Figure 3:
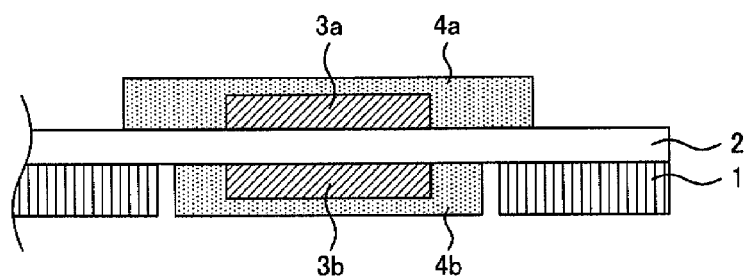
FIG. 3 is a schematic sectional view for explaining a suspension substrate according to the present invention.

FIG. 2 is a sectional view of the area R along the line A-A in FIG. 1, showing the section of the read wiring 3x. Also, the write wiring 3y is also explained like the read wiring 3x in the present invention. The suspension substrate shown in FIG. 2 is provided with an insulation layer 2, a pair of wirings 3 constituted of an upper wiring 3a formed on one surface of the insulation layer 2 and a lower wiring 3b formed on the other surface of the insulation layer 2, and a metal substrate 1 formed on the lower wiring 3b side surface of the insulation layer 2. Also, the suspension substrate of the present invention may be provided with an upper cover layer 4a formed so as to cover the upper wiring 3a and a lower cover layer 4b formed so as to cover the lower wiring 3b as shown in FIG. 3.

Figure 13:
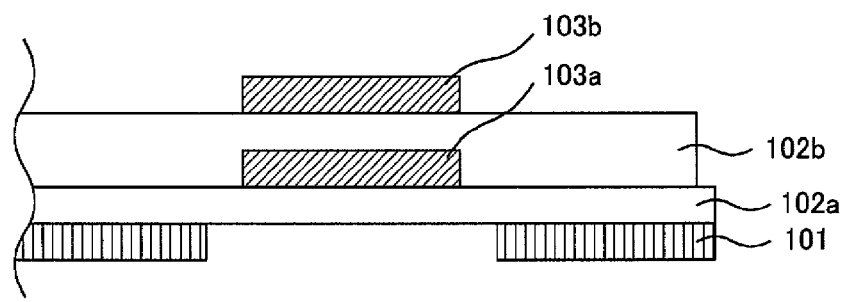
FIG. 13 is a schematic sectional view for explaining a conventional suspension substrate having a pair of wirings which is disposed in laminated arrangement.

According to the present invention, as mentioned above, the whole thickness of the suspension substrate can be reduced by forming the lower wiring on the metal substrate side surface of the insulation layer. For this reason, the suspension substrate of the present invention can be formed as one having a small thickness in the same manner as in the case of using the above plane arrangement even though it is provided with the pair of wirings disposed in laminated arrangement. Also, because the suspension substrate can be thinned, the suspension substrate can be made to be light-weight at the same time. The reduction in weight enables an improvement in the following capability of the suspension substrate to the magnetic disc and therefore, a highly reliable HDD can be obtained. Also, in the case of conventional suspension substrates having a pair of wirings disposed in laminated arrangement, a first insulation layer 102a and a second insulation layer 102b are formed on one surface of a metal substrate 101 as shown in FIG. 13 mentioned above. Moreover, there is the case where a cover layer is formed so as to cover the above wiring 103b though not shown in drawings. In this case, the first insulation layer, the second insulation layer, and the cover layer are localized on one surface of the metal substrate and further, a resin such as a polyimide (PI) is used as the structural material of these layers. Therefore, the suspension substrate is easily warped by the shrinkage of the resin in the production of the suspension substrate. The suspension of the present invention, on the other hand, has a structure excluding the second insulation layer 102b shown in FIG. 13 mentioned above, and therefore, the generation of warpage caused by the shrinkage of the resin can be limited. Also, the present invention has the laminated arrangement structure in which the upper and lower wirings are laminated through the insulation layer and therefore has the advantage that there is no necessity of increasing the width of the wiring and of decreasing the thickness of the insulation layer (first insulation layer) as compared with the case of using the aforementioned plane arrangement.

The structure of each part of the suspension substrate of the present invention will be explained.

1. Pair of Wirings

First, the pair of wirings used in the present invention will be explained. The pair of wirings used in the present invention is provided with an upper wiring formed on one surface of the insulation layer and a lower wiring formed on the other surface of the insulation layer (see FIG. 2). Particularly, in the present invention, the pair of wirings is preferably a differential wiring. This is because a suspension substrate can be obtained which can transmit electric signals by differential transmission and is therefore adaptable to an increase in rate of information throughput.

Any material may be used as the materials of the upper and lower wirings without any particular limitation insofar as it has desired conductivity. Examples of these materials may include copper (Cu). Materials having electric characteristics according to pure copper may be used as the wiring material. In the present invention, the materials of the upper and lower wirings may be the same or be different. However, the materials are preferably the same because this facilitates designing of the wiring. The upper and lower wirings may be provided with a protective plating layer made of nickel (Ni) or gold (Au) on the surface thereof.

The thicknesses of the upper and lower wirings are preferably in a range from 4 µm to 18 µm and more preferably 5 µm to 12 µm. If the thickness of the wiring is too small, there is a possibility that desired conductivity cannot be obtained, whereas if the thickness of the wiring is too large, there is a possibility that the rigidity of the suspension substrate becomes too high. In the present invention, the thicknesses of the upper and lower wirings may be either the same or different. Also, particularly, the thickness of the lower wiring is preferably lower than that of the metal substrate. If the thickness of the lower wiring is larger than that of the metal substrate, there is a possibility that it becomes difficult to design the wiring. When the lower cover layer that covers the lower wiring is formed, the total thickness of the lower wiring and the lower cover layer formed on the lower wiring is preferably lower than the thickness of the metal substrate.

The widths of the upper and lower wirings are respectively preferably within a range from, for example, 10 µm to 300 µm. When the width of the wiring is too small, there is a possibility that the impedance cannot be sufficiently lowered whereas when the width of the wiring is too large, there is a possibility that the suspension substrate cannot be sufficiently densified. In the present invention, the widths of the upper and lower wirings may be the same or different.

Figure 4A:
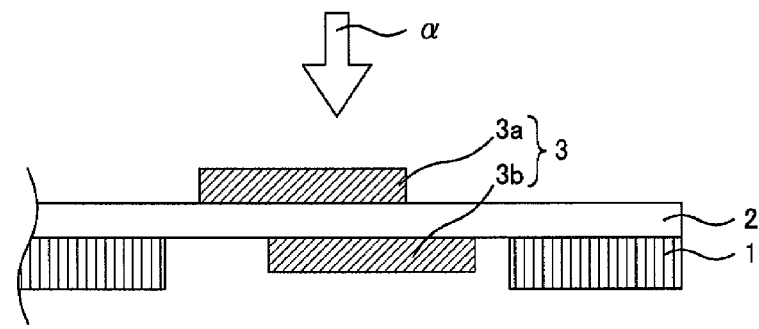
FIGS. 4A and 4B are each is a schematic sectional view for explaining a suspension substrate according to the present invention.
Figure 4B:
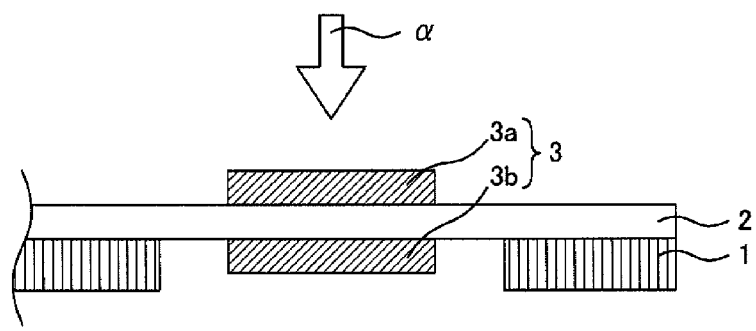

Also, in the present invention, though there is no particular limitation to the positional relation between the upper and lower wirings in a planar view, these wirings are preferably formed in such a manner that at least a part of the both is overlapped in a planar view. This is because the wiring is easily designed. Specific examples of such a positional relation may include the case where, as shown in FIG. 4A, the upper wiring 3a and the lower wiring 3b are partly overlapped on each other in a planar view taken from the direction of the arrow α and the case where, as shown in FIG. 4B, the upper wiring 3a and the lower wiring 3b are perfectly overlapped on each other in a planar view taken from the direction of the arrow α.

2. Insulation Layer

Next, the insulation layer in the present invention will be explained. The insulation layer used in the present invention is provided with the upper wiring on one surface thereof and the lower wiring and metal substrate on the other surface (see FIG. 2). Although no particular limitation is imposed on the material of the insulation layer insofar as it has desired insulation properties, examples of the material of the insulation layer may include a polyimide (PI). Also, the material of the insulation layer may be either a photosensitive material or nonphotosensitive material. Also, the thickness of the insulation layer is preferably in a range from, for example, 5 µm to 30 µm and more preferably in a range from 10 µm to 20 µm.

3. Metal Substrate

Next, the metal substrate of the present invention will be explained. The metal substrate in the present invention is formed on the surface of the insulation layer on the lower wiring side (see FIG. 2). Also, as shown in FIG. 2, the metal substrate in the present invention is preferably provided with a groove for forming the lower wiring. Although no particular limitation is imposed on the material of the metal substrate insofar as it has desired conductivity and spring properties, examples of the material of the metal substrate may include stainless steel. Also, the thickness of the metal substrate is preferably in a range from, for example, 10 µm to 30 µm and more preferably in a range from 15 µm to 25 µm.

Also, in the present invention, the metal substrate is preferably disposed at such a distance as not to affect the differential impedance of a differential wiring constituted of the upper and lower wirings. This facilitates designing of the differential impedance so that the impedance of the differential wiring can be reduced. Specifically, as shown in FIG. 5, the metal substrate is preferably formed at a position distant to the extent that it has no influence on the differential impedance of a differential wiring 3X constituted of the upper and lower wirings 3a and 3b in a planar view taken from the direction of the arrow α.

Figure 5:
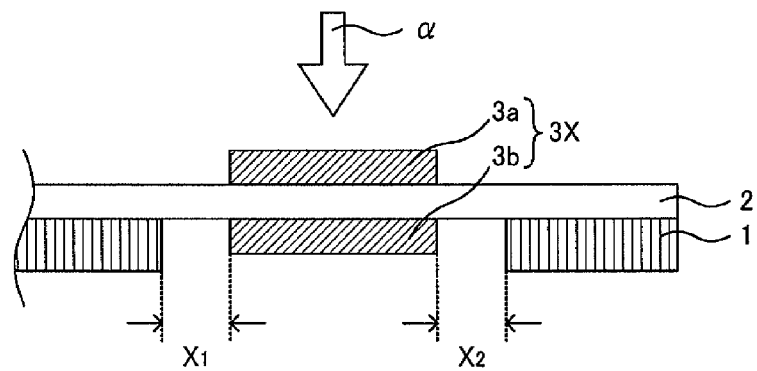
FIG. 5 is a schematic sectional view for explaining a suspension substrate according to the present invention.

Here, as shown in FIG. 5, the distances between the ends of the lower wiring 3b and the ends of the metal substrate 1 are $X_1$ and $X_2$ in the sectional view. $X_1$ and $X_2$ are respectively preferably, for example, 10 µm or more though no particular limitation is imposed on the distances of $X_1$ and $X_2$ insofar as they are independent of each other and have no influence on the differential impedance of the differential wiring. The upper limits of $X_1$ and $X_2$ are, on the other hand, for example, about 60 µm, though no particular limitation is imposed on these upper limits insofar as they are respectively a value enough to secure desired spring properties. Though the metal substrate 1 exists in the vicinity of each end (left end and right end in the drawing) of the lower wiring 3b in FIG. 5, the metal substrate 1 in the vicinity of one end of the lower wiring 3b may not be present in the present invention. In any case, the metal substrate 1 in the present invention may be formed on the surface of a base insulation layer 2 like the lower wiring 3b and allows the suspension substrate not to be thick while keeping the strength and elasticity of the suspension substrate.

4. Adjusting Insulation Layer

Then, the adjusting insulation layer to be used in the present invention will be explained. The suspension substrate of the present invention is preferably provided with an adjusting insulation layer that adjusts the distance from the upper wiring to the lower wiring between the both wirings. In the present invention, there is the case where the insulation layer described in the above "2. Insulation layer" is referred to as "base insulation layer" to distinguish from the adjusting insulation layer. Although the adjusting insulation layer in the present invention may be formed either between the upper wiring and the base insulation layer or between the base insulation layer and the lower wiring, the latter (between the base insulation layer and the lower wiring) is preferable. This is because the whole thickness of the suspension substrate can be limited. In the present invention, the installation of the adjusting insulation layer makes it possible to adjust the distance between the upper wiring and the lower wiring, enabling a reduction in the coupling capacitance and inductance between both wirings, thereby making it possible to improve frequency characteristics (particularly high-frequency characteristics).

Figure 6:
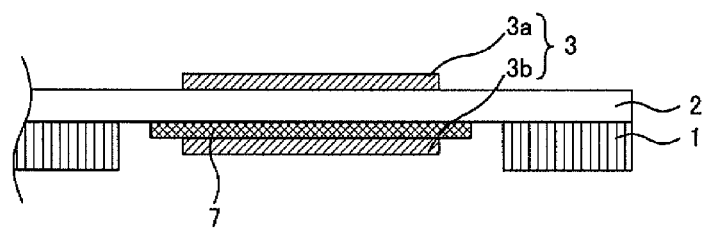
FIG. 6 is a schematic sectional view for explaining a suspension substrate according to the present invention.
Figure 7:
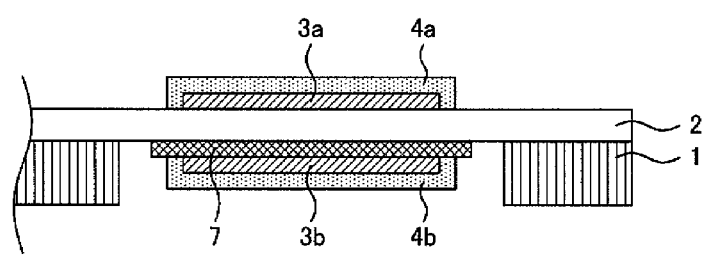
FIG. 7 is a schematic sectional view for explaining a suspension substrate according to the present invention.

FIG. 6 is a schematic sectional view showing an example of the suspension substrate provided with the adjusting insulation layer. The suspension substrate shown in FIG. 6 comprises a base insulation layer 2, a pair of wirings 3 constituted of an upper wiring 3a formed on one surface of the base insulation layer 2 and a lower wiring 3b formed on the other surface of the base insulation layer 2, a metal substrate 1 formed on the surface of the base insulation layer 2 on the lower wiring side 3b, and an adjusting insulation layer 7 formed between the base insulation layer 2 and the lower wiring 3b. Also, the suspension substrate of the present invention may be provided with an upper cover layer 4a formed so as to cover the upper wiring 3a and a lower cover layer 4b formed so as to cover the lower wiring 3b as shown in FIG. 7.

Also, as mentioned above, the installation of the adjusting insulation layer in the present invention is particularly useful when the pair of wirings consisting of an upper wiring and a lower wiring is a differential wiring. This reason is as follows. Specifically, as shown in FIG. 2 mentioned above, the frequency characteristics (particularly, high-frequency characteristics) of the suspension substrate provided with no adjusting insulation layer are largely dependent on the distance between the upper and lower wirings and, in other words, on the thickness of the base insulation layer 2. For this reason, it is necessary to increase the thickness of the base insulation layer to attain the high-frequency characteristics required to transmit data at high speed (for example, about 15 μm). However, if the thickness of the base insulation layer is increased, the influence of the shrinkage of a resin is increased, posing the problem that the suspension substrate is easily warped. Also, the suspension substrate is produced by using a laminate obtained by laminating stainless steel (metal substrate), polyimide (insulation layer) and copper (conductive layer) in this order. When a commercially available laminate (inexpensive mass-products) is used as the aforementioned laminate, the range of selection in the thickness of the base insulation layer is narrow and there is therefore a possibility that required high-frequency characteristics are not obtained. Also, when a laminate provided with the base insulation layer having a larger thickness than that of a commercially available laminate is used, a problem of increase in cost is posed.

On the contrary, when the adjusting insulation layer is installed, the distance between the upper and lower wirings can be increased without changing the thickness of the base insulation layer. The thickness of the base insulation layer is not changed by this and it is therefore possible to restrain the generation of warpage caused by the shrinkage of a resin. Moreover, because the distance between the upper and lower wirings can be increased, an improvement in frequency characteristics can be made. Also, since a commercially available laminate can be used, a problem of increase in cost can be prevented. Also, in the case of forming the adjusting insulation layer 7 between the base insulation layer 2 and the lower wiring 3 as shown in FIG. 6 mentioned above, this has the advantage that the whole thickness of the suspension substrate is not changed. When the distance between the upper and lower wirings is increased, there is the possibility that the differential impedance is increased. In this case, the differential impedance can be reduced by so adjusting that the width of the upper wiring and/or lower wiring is increased, making it possible to obtain a desired differential impedance.

No particular limitation is imposed on the material of the adjusting insulation layer of the present invention and the same materials as those used for the above base insulation layer and cover layer may be used. Specific examples of these materials may include a polyimide (PI). Also, in the present invention, the material of the adjusting insulation layer may be the same as the material of the cover layer or may be the same as the material of base insulation layer. The generation of warpage caused by the difference in shrinkage factor can be limited by using the same materials. Moreover, the adjusting insulation layer, base insulation layer, and cover layer may be all formed of the same material. Also, a material having a dielectric constant different from those of the above base insulation layer and cover layer may be used due to the adjustment of electric characteristics and producing conveniences.

The thickness of the adjusting insulation layer in the present invention is preferably designed to be a value enough to limit the crosstalk between the upper and lower wirings. Also, when the pair of wirings constituted of the upper and lower wirings is a differential wiring, the thickness of the adjusting insulation layer is preferably designed to be a value enough to improve the frequency characteristics. The thickness of the adjusting insulation layer is preferably in a range from, for example, 1 μm to 10 μm, more preferably in a range from 4 μm to 6 μm, and even more preferably in a range from 4.5 μm to 5.5 μm though no particular limitation is imposed on it.

Also, when the adjusting insulation layer 7 is formed between the base insulation layer 2 and the lower wiring 3b as shown in FIG. 6 mentioned above, the total thickness of the adjusting insulation layer 7 and lower wiring 3b is preferably lower than the thickness of the metal substrate 1. If the total thickness of the adjusting insulation layer and lower wiring is larger than the thickness of the metal substrate, there is a possibility of the suspension substrate being thick though such a thickness does not largely contribute to the strength of the substrate. Also, when the lower wiring 3b is provided with a protective plating layer on the surface thereof, the total thickness of the adjusting insulation layer, lower wiring, and protective plating layer is preferably lower than the thickness of the metal substrate.

The adjusting insulation layer in the present invention is preferably formed at the part where the upper wiring and the lower wiring are overlapped on each other in a planar view. In the case where the upper wiring 3a and the lower wiring 3b are partly overlapped on each other in a planar view taken from the direction of the arrow α as shown in, for example, FIG. 4A mentioned above, at least the adjusting insulation layer is preferably formed at the overlapped part in a planar view taken from the direction of the arrow α. Also, in the case where the upper wiring 3a and the lower wiring 3b are perfectly overlapped on each other in a planar view taken from the direction of the arrow α as shown in FIG. 4B mentioned above, at least the adjusting insulation layer is preferably formed at the overlapped part in a planar view taken from the direction of the arrow α.

5. Cover Layer

Next, the cover layer used in the present invention will be explained. In the suspension substrate of the present invention, the cover layers (upper and lower cover layers) are preferably formed so as to cover the wirings (upper wiring and lower wiring) (see FIGS. 3 and 7). This is because the deterioration of the wirings can be limited. In the present invention, at least one of the upper and lower cover layers is preferably formed and both of the upper and lower cover layers are more preferably formed. This is because the generation of warpage can be more limited. Specifically, when both the upper and lower cover layers are formed, this means that cover layers are formed on both surfaces of the metal substrate and it is therefore possible to limit the generation of warpage further by properly selecting the dimensions (width and thickness) of the upper and lower cover layers.

Examples of the material of the cover layer may include a polyimide (PI). Also, the material of the cover layer may be either a photosensitive material or nonphotosensitve material. Also, the thickness of the cover layer is preferably in a range from, for example, 3 μm to 30 μm. In this case, the materials and thicknesses of the upper and lower cover layers may be the same or different. Also, as mentioned above, when the lower cover layer which covers the lower wiring is formed, the total thickness of the lower wiring and lower cover layer formed on the lower wiring is preferably lower than the thickness of the metal substrate. This facilitates designing of the wirings. Also, in the case where the adjusting insulation layer 7 between the base insulation layer 2 and the lower wiring 3b as shown in FIG. 7 mentioned above is formed, the total thickness of the adjusting insulation layer 7, lower wiring 3b, and lower cover layer 4b formed on the lower wiring 3b is preferably lower than the thickness of the metal substrate 1. As mentioned above, it is not preferable that the lower cover layer protrude from the metal substrate in the present invention. Also, in the present invention, the cover layer preferably covers the wiring in a larger area within the range where the transmission of intended electric signals is not hindered and the flexibility of the suspension substrate can be secured.

6. Suspension Substrate

The suspension substrate of the present invention is provided with the aforementioned pair of wirings, insulation layer, metal substrate, cover layer, and the like. In the present invention, the pair of wirings (pair of wirings as shown in FIG. 2 mentioned above) formed in laminated arrangement may be used as at least one of the read and write wirings. In the present invention, both of the read and write wirings are each preferably a pair of wirings formed in laminated arrangement. This is because a suspension substrate that is resistant to crosstalk and corresponds to high speed data processing can be obtained. Moreover, if both of the read and write wirings are respectively a pair of wirings disposed in laminated arrangement, a suspension substrate which is well balanced and is resistant to strain can be obtained.

Also, when the above pair of wirings is a differential wiring, the differential impedance of the suspension substrate of the present invention is preferably appropriately selected from the viewpoint of the impedance matching between the magnetic head and preamplifier, and is preferably in a range from 10Ω to 30Ω. In order to obtain a differential impedance to be intended, it is preferable to properly select the thicknesses and widths of the upper wiring, lower wiring, base insulation layer, and adjusting insulation layer, and each dielectric constant of the base insulation layer and adjusting insulation layer.

Also, the suspension substrate of the present invention is generally provided with a gimbal part mounted with a magnetic head slider and a junction substrate connecting part. The structures and positions of these parts are the same as those of a general suspension substrate and the descriptions of these parts are therefore omitted here.

7. Method of Producing a Suspension Substrate

Next, a method of producing a suspension substrate according to the present invention will be explained. No particular limitation is imposed on the method of producing a suspension substrate insofar as it is a method enabling a production of a suspension substrate having the above structure. An example of the method of producing a suspension substrate in the present invention will be explained as to, particularly, the formation of a pair of wiring with reference to FIGS. 8A to 8G. FIGS. 8A to 8G show an example of the method of producing a suspension substrate which is not provided with the aforementioned adjusting insulation layer.

Figure 8A:
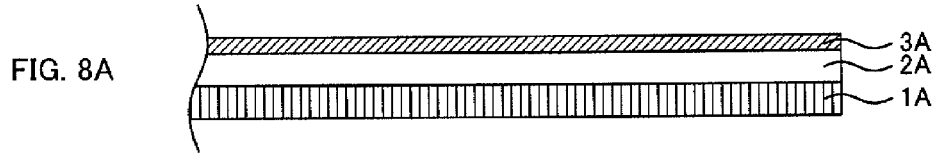
FIGS. 8A to 8G are a schematic sectional view showing an example of a method of producing a suspension substrate according to the present invention.
Figure 8B:
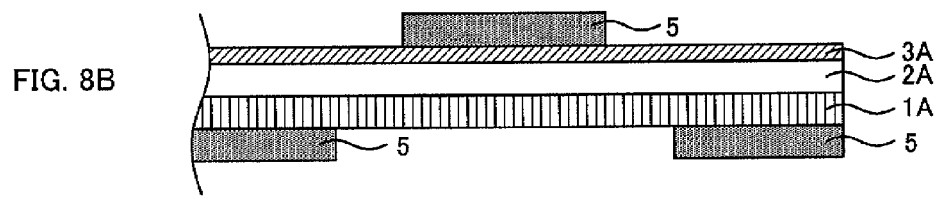
Figure 8C:
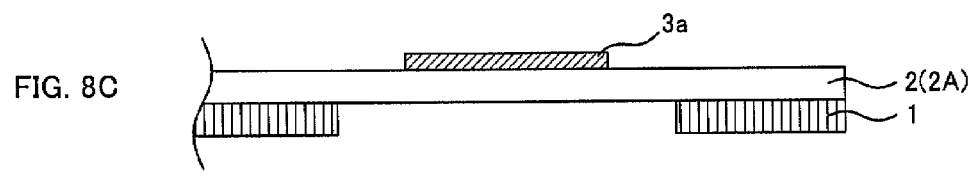
Figure 8D:
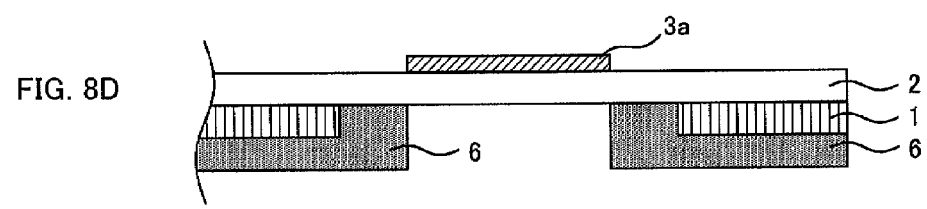
Figure 8E:
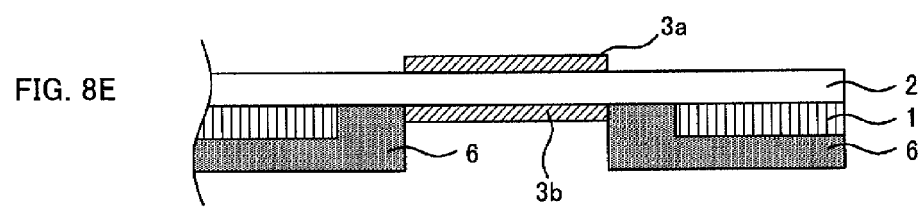
Figure 8F:
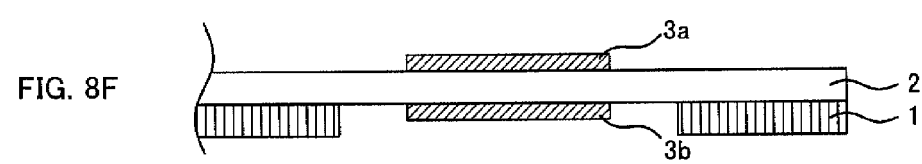
Figure 8G:
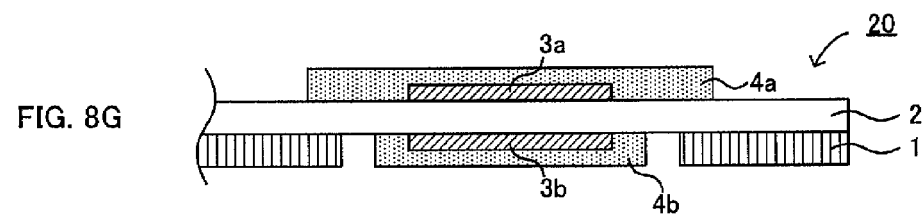

In the method of producing a suspension substrate shown in FIGS. 8A to 8G, first, a laminate in which a metal substrate 1A (for example, stainless steel), an insulation layer 2A (for example, a polyimide) and a conductive layer 3A (for example, copper) are laminated in this order is prepared (FIG. 8A). Then, a dry film resist is laminated on the surface of the conductive layer 3A, followed by exposing to light and developing to thereby form a resist pattern 5. A resist pattern 5 is likewise formed on the surface of the metal substrate 1A (FIG. 8B). Then, the conductive layer 3A and metal substrate 1A exposed from the resist pattern 5 are etched and the resist pattern 5 is peeled off after etched to thereby form the upper wiring 3a and the metal substrate 1 (FIG. 8C). Next, the insulation layer 2A is processed into a desired form by etching to form an insulation layer 2 (non-illustrated place is processed). Then, a dry film resist is laminated on the metal substrate 1 side surface of the insulation layer 2, followed by exposing to light and developing to form a resist pattern 6 (FIG. 8D). Then, a lower wiring 3b is formed in the exposed part of the insulation layer 2 exposed from the resist pattern 6 by the additive method such as the electrolyte copper plating method (FIG. 8E). Thereafter, the resist pattern 6 is peeled off (FIG. 8F). Finally, an upper cover layer 4a and a lower cover layer 4b are formed by a known method (for example, photographic method). Thus, a suspension substrate 20 can be obtained (FIG. 8G).

Also, other methods of producing a suspension substrate according to the present invention will be explained as to, particularly, the formation of the pair of wirings with reference to FIGS. 9A to 9F. FIGS. 9A to 9F show an example of the method of producing a suspension substrate provided with the above adjusting insulation layer.

In the method of producing a suspension substrate shown in FIGS. 9A to 9F, first, an upper wiring 3a and a metal substrate 1 are formed in the same manner as in the case shown in FIGS. 8A and 8B (FIG. 9A). Next, the insulation layer 2A is processed into a desired form by etching to form an insulation layer 2 (non-illustrated place is processed). Next, an adjusting insulation layer 7 is formed by a known method (for example, photographic method) (FIG. 9B). Next, a dry film resist is laminated on the metal substrate 1 side surface of the insulation layer 2, followed by exposing to light and developing to form a resist pattern 6 (FIG. 9C). Next, a lower wiring 3b is formed in the exposed part of the adjusting insulation layer 7 exposed from the resist pattern 6 by the additive method such as the electrolyte copper plating method (FIG. 9D). Then, the resist pattern 6 is peeled off (FIG. 9E). Finally, an upper cover layer 4a and a lower cover layer 4b are formed by a known method (for example, photographic method). Thus, a suspension substrate 20 with the adjusting insulation layer 7 can be obtained (FIG. 9F).

B. Suspension

Next, a suspension according to the present invention will be explained. The suspension of the present invention includes the aforementioned suspension substrate.

Figure 10:
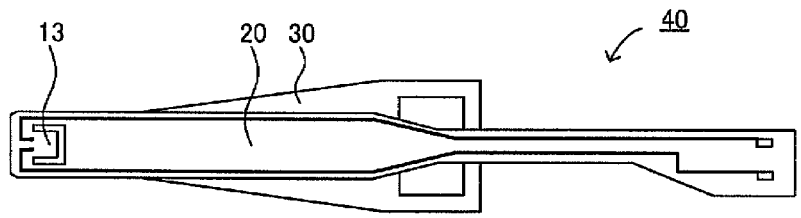
FIG. 10 is a schematic plan view showing an example of a suspension according to the present invention.

FIG. 10 is a schematic plan view showing one example of the suspension of the present invention. A suspension 40 shown in FIG. 10 is provided with the above suspension substrate 20 and a load beam 30 mounted on the surface of the suspension substrate 20 on the side opposite to the surface on which a magnetic head slider package area 13 is formed.

According to the present invention, the above suspension substrate is used and therefore, a suspension which is more miniaturized can be formed.

The suspension of the present invention is provided with at least a suspension substrate and also, provided with a load beam usually. The structure of the suspension substrate is the same as that described in the above "A. Suspension substrate" and therefore, the explanations of the suspension substrate are omitted here. Also, as the load beam, the same one that is used in a general suspension may be used.

C. Suspension with a Head

Next, a suspension with a head according to the present invention will be explained. The suspension with a head according to the present invention is provided with the above suspension and a magnetic head slider mounted on the above suspension.

Figure 11:
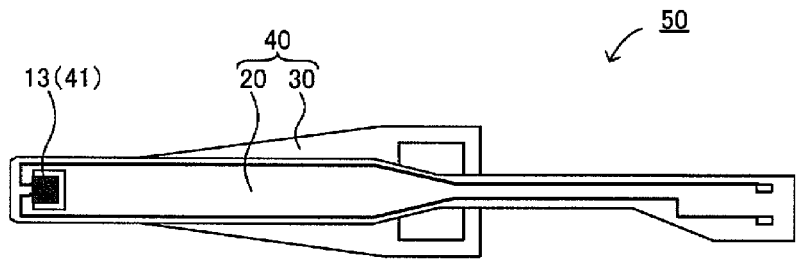
FIG. 11 is a schematic plan view showing an example of a suspension with a head according to the present invention.

FIG. 11 is a schematic plan view showing an example of the suspension with a head according to the present invention. A suspension 50 with a head as shown in FIG. 11 is provided with the above suspension 40 and a magnetic head slider 41 mounted on a magnetic head slider mounting area 13 of the suspension 40.

According to the present invention, a more miniaturized suspension with a head can be made by using the above suspension.

The suspension with a head according to the present invention is provided with at least a suspension and also, provided with a magnetic head slider. The structure of the suspension is the same as that described in the above "B. Suspension" and therefore, the explanations of the suspension are omitted here. Also, as the magnetic head slider, the same one that is used in a general suspension with a head may be used.

D. Hard Disc Drive

Next, a hard disc drive according to the present invention will be explained. The hard disc drive of the present invention comprises the aforementioned suspension with a head.

Figure 12:
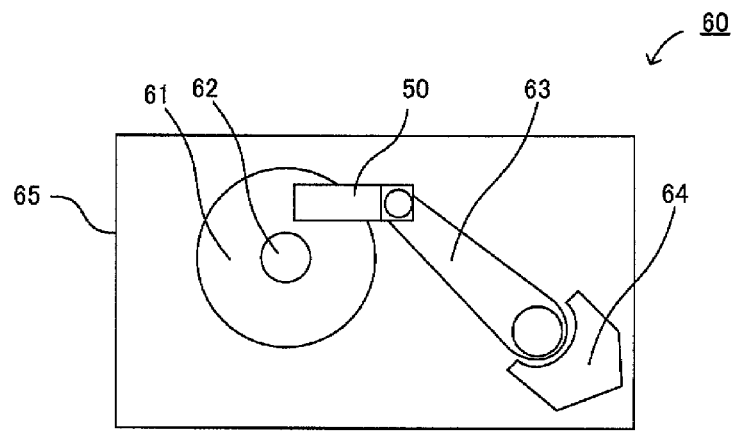
FIG. 12 is a schematic plan view showing an example of a hard disk drive according to the present invention.

FIG. 12 is a schematic plan view showing an example of the hard disc drive of the present invention. A hard disc drive 60 shown in FIG. 12 is provided with the aforementioned suspension 50 with a head, a disc 61 in which data is written and from which data is read by the suspension 50 with a head, a spindle motor 62 that rotates the disc 61, an arm 63 connected with the suspension 50 with a head, a voice coil motor 64 that moves the magnetic head slider of the suspension 50 with a head, and a case 65 that seals the above members.

According to the present invention, the aforementioned suspension with a head is used, enabling the production of a hard disk drive which is more functionalized.

The hard disc drive of the present invention is provided with at least a suspension with a head and is usually provided further with a disc, a spindle motor, an arm, and a voice coil motor. The suspension with a head is the same structure as the above "C. Suspension with a head" and the description thereof is omitted. Also, as other members, the same members that are used in usual hard disc drives may be used.

The present invention is not limited to the aforementioned embodiments. These embodiments are examples and whatever has substantially the same structure and produces the same action effect as the technical spirit described in the claim of the present invention is embraced by the technical scope of the present invention.

EXAMPLES

The present invention will be explained in more detail by way of examples.

Example 1

Figure 14:
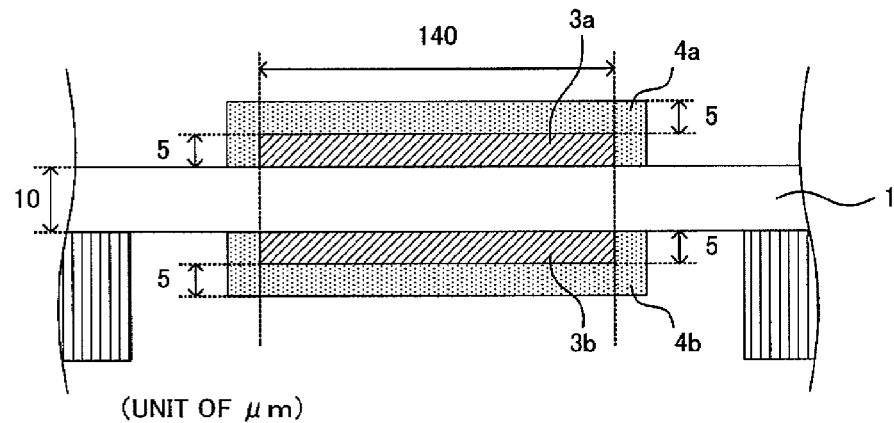
FIG. 14 is a schematic sectional view for explaining a suspension substrate in Example 1.

The differential impedance in a suspension substrate having the dimensions shown in FIG. 14 was calculated by simulation. The conditions of the simulation are as follows.

| <Simulation condition> | |
|---|---|
| Metal substrate 1 | Stainless |
| Base insulation layer 2 | Polyimide (Er = 3) |
| Upper wiring 3a | Pure copper |
| Lower wiring 3b | Pure copper |
| Upper cover layer 4a | Polyimide (Er = 3) |
| Lower cover layer 4b | Polyimide (Er = 3) |

As a result, the differential impedance was 14Ω.

Example 2

Figure 15:
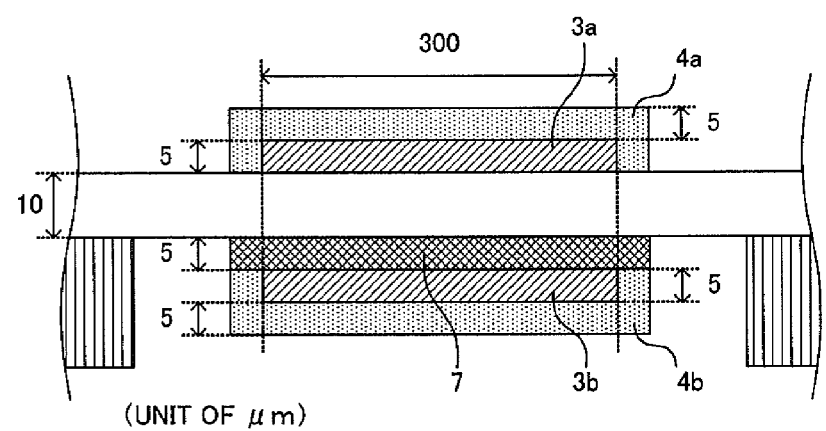
FIG. 15 is a schematic sectional view for explaining a suspension substrate in Example 2.

The differential impedance in a suspension substrate having the dimensions shown in FIG. 15 was calculated by simulation. The condition of the simulation is as follows.

| <Simulation condition> | |
|---|---|
| Metal substrate 1 | Stainless |
| Base insulation layer 2 | Polyimide (Er = 3) |
| Upper wiring 3a | Pure copper |
| Lower wiring 3b | Pure copper |
| Upper cover layer 4a | Polyimide (Er = 3) |
| Lower cover layer 4b | Polyimide (Er = 3) |
| Adjusting insulation layer 7 | Polyimide (Er = 3) |

As a result, the differential impedance was 10Ω.

Example 3

Figure 16:
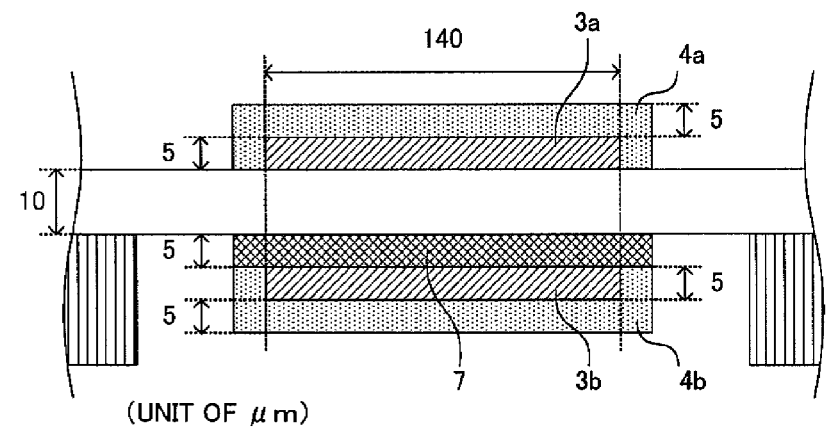
FIG. 16 is a schematic sectional view for explaining a suspension substrate in Example 3.

The differential impedance in a suspension substrate having the dimensions shown in FIG. 16 was calculated by simulation. The condition of the simulation was made to be the same as that in Example 2 except that the widths of the upper and lower wirings were each changed to 140 µm. As a result, the differential impedance was 20Ω.

What is claimed is:

1. A suspension substrate comprising:
an insulation layer;
a pair of wirings consisting of an upper wiring formed on one surface of the insulation layer and a lower wiring formed on the other surface of the insulation layer; and
a metal substrate formed on the surface of the insulation layer on the lower wiring side,
wherein the upper wiring and the lower wiring are insulated from each other,
the metal substrate is provided with a groove which exposes the insulation layer, and the lower wiring is formed in the groove such that an end of the lower wiring and an end of the metal substrate is separated in a planar view, and
the pair of wirings consisting of the upper wiring and the lower wiring is a differential wiring.

2. The suspension substrate according to claim 1, further comprising an adjusting insulation layer, between the insulation layer and the lower wiring, to adjust a distance between the upper wiring and the lower wiring.

3. The suspension substrate according to claim 2, wherein a total thickness of the adjusting insulation layer and the lower wiring is lower than a thickness of the metal substrate.

4. The suspension substrate according to claim 1, further comprising an adjusting insulation layer, between the insulation layer and the upper wiring, to adjust a distance between the upper wiring and the lower wiring.

5. The suspension substrate according to claim 1, wherein an upper cover layer is formed so as to cover the upper wiring and a lower cover layer is formed so as to cover the lower wiring.

6. A suspension comprising the suspension substrate as claimed in claim 1.

7. A suspension with a head comprising the suspension as claimed in claim 6 and a magnetic head slider mounted on the suspension.

8. A hard disc drive comprising the suspension with a head as claimed in claim 7.

* * * * *

UNITED STATES PATENT AND TRADEMARK OFFICE
CERTIFICATE OF CORRECTION

PATENT NO. : 8,749,923 B2  
APPLICATION NO. : 12/641656  
DATED : June 10, 2014  
INVENTOR(S) : Hirata Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 320 days.

Signed and Sealed this  
Eighteenth Day of August, 2015

Michelle K. Lee  
*Director of the United States Patent and Trademark Office*